Dec. 25, 1934.   C. R. BULLER   1,985,279
FLUID CONTROL VALVE
Filed July 19, 1934
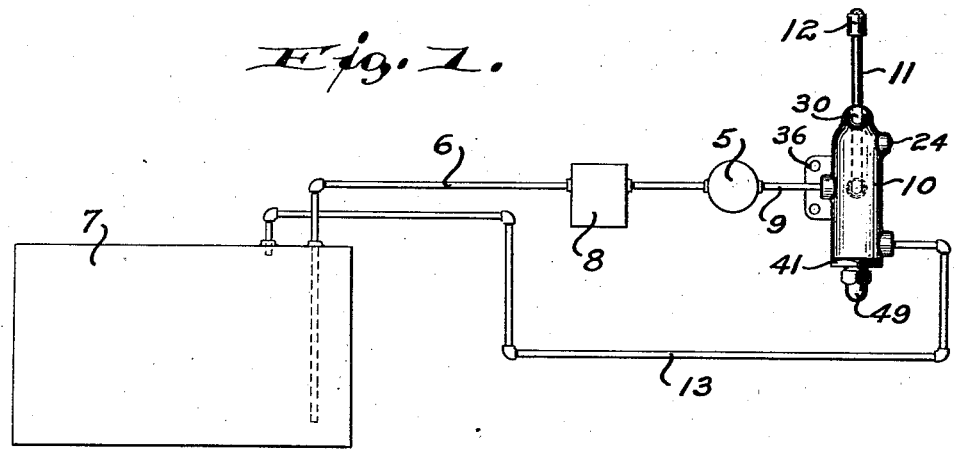
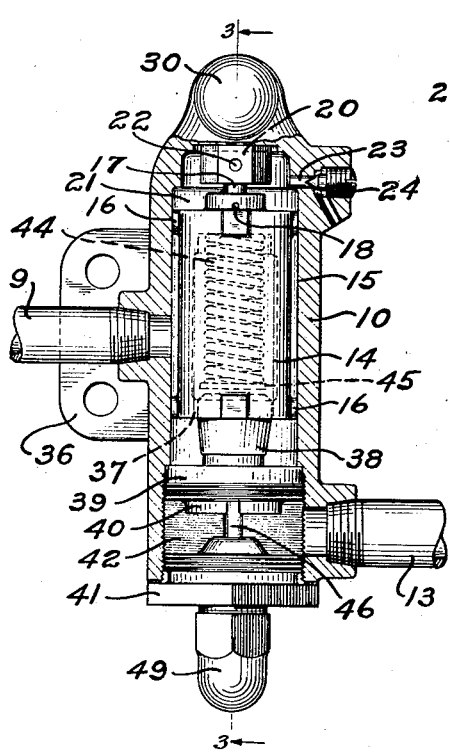
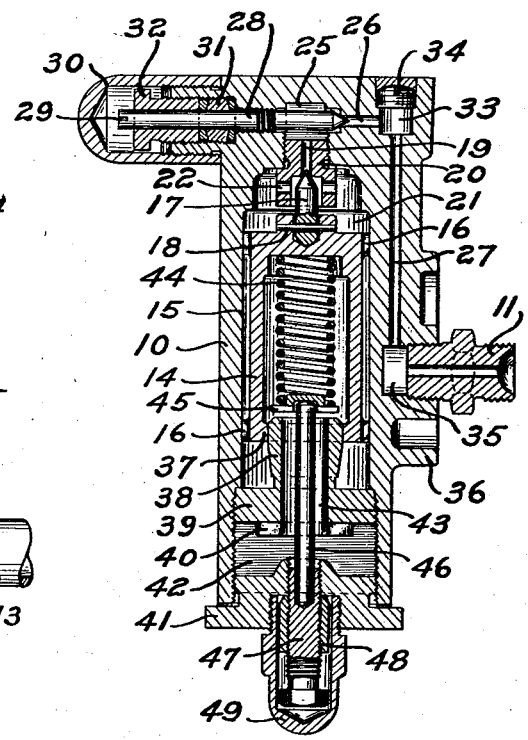
INVENTOR.
Charles R. Buller
BY
Morsell, Lieber & Morsell
ATTORNEYS.

Patented Dec. 25, 1934

1,985,279

UNITED STATES PATENT OFFICE 1,985,279

FLUID CONTROL VALVE

Charles R. Buller, Milwaukee, Wis., assignor to The Heil Co., Milwaukee, Wis., a corporation of Wisconsin Application July 19, 1934, Serial No. 735,929

12 Claims. (Cl. 137—153)

The present invention relates in general to improvements in the art of regulating the delivery of liquid fuel such as oil to an oil burner or the like, and relates more specifically to improvements in the construction and operation of oil burner regulating and relief valves.

Generally defined, an object of the invention is to provide an improved fluid control valve which is simple in construction and efficient in operation.

While various types and forms of oil burner regulating and relief devices have heretofore been proposed, considerable difficulty has been encountered with substantially all of these prior structures, due either to complications in construction or to ineffective operation. A practical device of this kind besides necessarily being as simple as possible, must also be readily adjustable, and thoroughly reliable in operation; and none of the prior structures have embodied all of these prerequisites.

It is therefore a more specific object of the present invention to provide an improved fuel regulating and relief valve for oil burners, which incorporates all of the above-mentioned requirements and desirable features.

Another specific object of the invention is to provide a fuel control valve of extremely simple construction, which can be readily manufactured and utilized in any standard oil burning system.

A further specific object of the invention is to provide a fuel oil regulator which is flexible in operation, and which may be readily installed and subsequently adjusted.

Still another specific object of the invention is to provide a fuel regulating and relief valve which is thoroughly reliable in operation and which requires minimum care and attention.

These and other objects and advantages will be apparent from the following detailed description.

A clear conception of one embodiment of the invention, and of the mode of constructing, installing and of manipulating fluid control valves built in accordance with the improvement, may be had by referring to the drawing accompanying and forming a part of this specification in which like reference characters designate the same or similar parts in the several views.

Fig. 1 is a diagram of a typical fuel oil supply system for oil burners, showing one of the improved regulating valves applied therein;

Fig. 2 is an enlarged part sectional view of the improved regulating valve; and

Fig. 3 is a similarly enlarged central vertical section through the valve, taken along the line 3—3 of Fig. 2.

While the invention has been specifically applied herein, to a fuel regulating and relief valve for domestic oil burner installations, it is not intended to unnecessarily restrict the scope by virtue of such specific embodiment.

In the fuel control system of Fig. 1, the oil pump 5 has its suction line 6 in constant communication with the lower portion of the fuel supply source or storage tank 7 through a strainer 8, and the pump discharge line 9 connects directly with the main casing 10 of the improved regulating valve. The main valve casing 10 has a connection 11 communicating with a nozzle or burner 12, and also has a return line 13 associated therewith, which may communicate with the top of the tank 7 as shown, but which may be entirely omitted in one-pipe systems.

The improved regulating and relief valve is shown in detail in Figs. 2 and 3, and has its main casing 10 bored longitudinally to receive a reciprocable plunger 14, the outer peripheral wall of which is spaced from the casing bore 15 by means of radial lugs 16 formed integral with the opposite ends of the plunger 14 and slidably engaging the bore 15. The pump discharge line 9 communicates directly with the annular space surrounding the plunger 14, and a shut-off needle 17, which is pivotally attached to one end of the plunger by means of a transverse pin 18, is cooperable with an orifice 19 formed in a block 20 so as to stop the delivery of oil from the source of supply when the oil pressure drops below proper atomizing pressure. The block 20 is fixedly attached to the main casing 10 by screw threads which permit convenient assembly or removal of the block 20 if necessary, and the pressure chamber 21 at the block end of the plunger 14 communicates with the orifice 19 along the sides of the shut-off needle 17 and through radial holes 22 formed in the block 20. The pressure chamber 21 has a relief and drainage passage 23 which is communicable with the exterior of the casing 10 past a screw-threaded, manually adjustable plug valve 24 as shown in Fig. 2.

The orifice 19 is in open communication with a chamber 25 which is in turn communicable through another orifice 26, with a conduit 27 formed in the main casing 10, and the orifice 26 is provided with a manually operable needle valve 28 having screw thread coaction with the casing 10 and extending through the auxiliary chamber 25. The outer end of the stem of the manual shut-off valve 28 is provided with a manipulating slot 29 which is accessible upon removal of a screw cap 30 coacting with the casing 10, and the medial portion of the needle valve stem is embraced by a packing 31 the retaining gland 32 of which is normally concealed within the cap 30 but which is also accessible for adjustment upon removal of this cap. The end of the fuel oil discharge conduit 27 nearest the needle valve 28, communicates with the second orifice 26 through a small chamber 33 which is permanently sealed against leakage by a plug 34, and the opposite end of this conduit 27 terminates in a chamber 35 with which the burner connection 11 is directly communicable. The main casing 10 may be provided with an integral supporting bracket 36 and the final fuel discharge connection 11 may be of any desired length depending upon the selected location of the casing 10 and burner 12, and this burner may in some cases be attached directly to the casing 10.

The plunger 14 is formed hollow and the end of this plunger, remote from the pressure chamber 21, is of reduced area by virtue of a central bore forming an annular flange 37 which is slidably cooperable with the periphery of a relatively fixed, hollow, peripherally tapered plug 38 formed integral with a threaded but definitely positioned partition 39. The partition 39 is fixedly positioned relative to the casing 10 and the plug 38 may be definitely positioned or removed, by means of spaced lugs 40 which are accessible from the exterior of the casing 10 upon removal of a screw threaded closure cap 41 coacting with the end of this casing. The space 42 between the partition 39 and the closure cap 41 communicates directly with the relief or by-pass line 13, and also communicates with the interior of the movable plunger 14 through the passage 43 extending centrally through the partition 39 and through the tapered plug 38.

The totally enclosed end of the plunger 14 is engaged on its inner face by one end of a compression spring 44 the opposite end of which reacts against a relatively fixed but adjustable abutment plate 45, both the spring 44 and the plate 45 being disposed wholly within the hollow plunger 14. The plate 45 coacts with an end of a rod 46, and this rod passes centrally through the passage 43 and chamber 42 and has its opposite end fitted within a socket in the inner end of an adjusting screw 47. The screw 47 is mounted centrally of and is adjustable relative to the closure cap 41, and is embraced by a lock nut 48 engaging the cap 41, as shown in Fig. 3. Both the head of the screw 47 and the lock nut 48 are housed within a readily removable housing cap 49 having screw thread coaction with a central bore in the main closure cap 41. With this assemblage of elements, the tension of the coil spring 44 may obviously be varied from the exterior of the main casing 10, without interfering with the normal movement or reciprocation of the plunger 14, and it is to be noted that neither the plate 45 nor the rod 46 interfere with the flow of liquid from the interior of the plunger 14 to the chamber 42 through the passage 43, since the plate 45 is provided with radial slots which always provide an opening for the passage of oil.

During construction of the improved valve mechanism, the various bores, orifices, and conduits in the main casing 10 may be readily and accurately formed by drilling or reaming with the aid of suitable jigs, and the screw threading may likewise be conveniently accomplished in a well-known manner. When assembling the structure, the needle valve 28, plug valve 24, and closure plug 34, may be quickly applied, and after insertion of the packing 31 and gland 32, the housing cap 30 may be applied to conceal these parts as well as the slotted end 29 of the needle valve stem. With the closure cap 41 removed, the block 20 may be inserted and secured in place, through the bore 15, whereupon the plunger 14 with the control needle 17 attached thereto, may be inserted within the bore 15. The pivotal mounting of the needle 17 upon the plunger 14 will cause this needle to automatically find a proper seating centrally of the adjacent end of the orifice 19, and also insures uniform flow of liquid around the point of the needle 17. After the plunger 14 has been thus applied within the casing 10, the spring 44 and plate 45 may be dropped centrally within the plunger 14, whereupon the partition 39 and its plug 38 may be screwed into place. The assemblage may then be readily completed by applying the rod 46, closure cap 41, screw 47, nut 48, and housing cap 49 in an obvious manner, thus making the device ready for application to a fuel supply and regulating system such as shown in Fig. 1.

When the improved control valve has been properly assembled and applied to a system, the valve mechanism may be conveniently adjusted to produce the desired operation thereof, by removing the housing caps 30, 49 and by subsequently opening the needle valve 28 and adjusting the cap screw 47. During subsequent normal operation of the regulator, the pump 5, which withdraws fuel oil from the tank 7 through the suction line 6 and strainer 8, delivers the oil under pressure through the discharge line 9 into the annular space between the plunger 14 and the casing bore 15. This oil, under pressure upon filling the chamber 21, forces the plunger 14 away from the block 20, thus causing the needle 17 to open the orifice 19, and simultaneously compressing the spring 44 and causing the flange 37 to move along the cylindrical portion of the plug 38. Oil under pressure from the chamber 21 then flows through the orifice 19 and chamber 25, past the needle valve 28 and through the orifice 26, chamber 27, and connection 11 to the burner nozzle 12. The quantity of fuel oil thus delivered to the burner will normally be maintained substantially uniform by virtue of the fact that the plunger 14 will float within the bore 15 according to variations in pressure within the chamber 21, and this pressure may be varied to meet requirements at the burner nozzle 12 by proper adjustment of the tension of the spring 44.

In case the pressure within the casing chamber 21 and acting upon the larger exposed end of the plunger 14, becomes sufficient to compress the spring 44 to such an extent that the flange 37 travels beyond the cylindrical portion of the plug 38 and around the tapered periphery of the latter, the pressure within the space surrounding the plunger 14 will be quickly relieved by the escape of oil to the interior of the plunger 14 through the annular gap produced between the flange 37 and plug 38. This escaping oil subsequently flows through the passage 43 and chamber 42 to the relief or return line 13, or merely flows through the relief opening at the lower end of the main casing 10 if no return line 13 is utilized.

From the foregoing description, it will be apparent that the present invention provides a simple control valve structure for oil burner systems or the like, comprising relatively few and simple parts, which can be readily manufactured, assembled, and installed in a system. The valve mechanism may be conveniently adjusted, and operates automatically after proper adjustment, to effectively control the quantity and the pressure of the fuel delivered to the burner. The structure is, moreover, sensitive and flexible in operation, and requires minimum attention in order to insure perfectly reliable operation. The adjustable plug valve 24 may be utilized to vent air from the casing 10 when starting or repriming the system, and the housing cap 30 merely improves the appearance of the valve unit and is not essential for proper operation. The annular groove at the smaller end of the tapered plug 38 is provided for safety purposes, and the improved valve structure has proven highly satisfactory in actual commercial use and has obviated all of the objections and disadvantages of prior control valves of the same general type.

It should be understood that it is not desired to limit the invention to the exact details of construction and to the precise mode of operation herein shown and described, for various modifications within the scope of the claims may occur to persons skilled in the art.

It is claimed and desired to secure by Letters Patent:

1. A fuel control device, comprising, a casing having a bore, a plunger movable along said bore in spaced relation thereto, means for delivering liquid under pressure to the space between said plunger and said bore, a needle carried by said plunger for normally controlling the discharge of liquid from said space, a normally fixed plug having a tapered portion cooperable with said plunger to permit escape of liquid from said space when the pressure therein reaches a predetermined value, and a spring acting upon said plunger in opposition to the fluid pressure within said space.

2. A fuel control device, comprising, a casing having a bore, a plunger movable along said bore in spaced relation thereto, means for delivering liquid under pressure to the space between said plunger and said bore, a needle carried by one end of said plunger for normally controlling the discharge of liquid from said space, a normally fixed plug having a tapered portion cooperable with an internal flange at the opposite end of said plunger to permit escape of liquid from said space when the pressure therein reaches a predetermined value, and a spring acting upon said plunger in opposition to the fluid pressure within said space.

3. A fuel control device, comprising, a casing having a bore, a plunger movable along said bore in spaced relation thereto, means for delivering liquid under pressure to the space between said plunger and said bore, a needle carried by said plunger for normally controlling the discharge of liquid from said space, a normally fixed plug having a tapered portion cooperable with said plunger to permit escape of liquid from said space when the pressure therein reaches a predetermined value, a spring acting upon said plunger in opposition to the fluid pressure within said space, and means for varying the tension of said spring.

4. A fuel control device, comprising, a casing having a bore, a plunger movable along said bore in spaced relation thereto, means for delivering liquid under pressure to the space between said plunger and said bore, a needle carried by one end of said plunger for normally controlling the discharge of liquid from said space, a normally fixed plug having a tapered portion cooperable with an internal flange at the opposite end of said plunger to permit escape of liquid from said space when the pressure therein reaches a predetermined value, a spring disposed within said plunger and acting upon the latter in opposition to the fluid pressure within said space, and means for effecting variation in the tension of said spring from the exterior of said casing.

5. A fuel control device, comprising, a casing having a bore, a hollow plunger movable along said bore but being separated therefrom by an annular space communicating with the plunger ends, means for supplying liquid under pressure to said space, a valve member carried by one end of said plunger for controlling the discharge of liquid from said space, a spring disposed within said plunger and acting upon the latter in opposition to the fluid pressure within said space, and a plug projecting into the opposite end of said plunger, said plug being fixed against movement with said plunger and having a constricted portion cooperable with said plunger end to effect relief of over-pressure from said space.

6. A fuel control device, comprising, a casing having a bore and liquid delivery passages communicating with the opposite ends of said bore, a plunger movable along said bore between said passages, means for supplying liquid under pressure to the opposite ends of said plunger, a valve member carried by one end of said plunger for controlling discharge of said liquid to one of said passages, a spring acting upon said plunger and tending to move said valve member toward closed position, and a normally fixed plug cooperating with said plunger to control delivery of excess liquid to the other of said passages.

7. A fuel control device, comprising, a casing having a bore and a liquid delivery orifice at one end of said bore, a hollow plunger slidable along said bore but being separated therefrom by an annular space, means for supplying liquid under pressure to said space and to the end of said plunger nearest said orifice, a needle valve member carried by said plunger and cooperating with said orifice to control the discharge of liquid through the latter, a spring coacting with the interior of said plunger in opposition to the liquid pressure acting upon said plunger end, and a stationary plug cooperable with the interior of the opposite end of said plunger to control discharge of liquid from said space for relief purposes.

8. A fuel control device, comprising, a casing having a series of liquid discharge orifices, a manually adjustable needle valve cooperable with one of said orifices, an automatically movable needle for controlling the flow of said liquid through another of said orifices, a fluid pressure actuated spring resisted plunger within said casing for moving said needle, a stationary plug cooperable with said plunger to divert excess liquid from said orifices through the interior of said plunger, and means for conducting liquid under pressure to the opposite ends of said plunger.

9. A fuel control device, comprising, a casing having a series of liquid discharge orifices, a manually adjustable needle valve cooperable with one of said orifices, an automatically movable needle for controlling the flow of said liquid through another of said orifices, a fluid pressure actuated spring resisted plunger within said casing for moving said needle, a stationary plug cooperable with said plunger to divert excess liquid from said orifices through the interior of said plunger, and means carried by said plunger for spacing the same from said casing to permit liquid under pressure to flow toward the opposite ends of the plunger from a medial inlet.

10. A fuel control device, comprising, a casing having a bore having liquid delivery and relief passages communicable with the opposite ends thereof, a hollow plunger movable within said bore and separated therefrom by an annular space having a high pressure liquid inlet communicating therewith, a liquid delivery control valve member carried by one end of said plunger and cooperating with said delivery passage, a spring coacting with the interior of said plunger end in opposition to liquid pressure acting upon the exterior of said end, said spring being disposed entirely within said plunger, a plug coacting with the opposite end of said plunger and cooperating therewith to control the flow of liquid from said space to said relief passage, and means extending through said plug for varying the tension of said spring.

11. A fuel control device, comprising, a casing having a bore, a hollow plunger movable within said bore, said bore having a liquid inlet and opposite end outlets, a needle carried by one end of said plunger for controlling one of said outlets, a plug carried by said casing and cooperating with the opposite plunger end to control the other of said outlets, a spring disposed within said plunger, and tension adjusting means for said spring extending through said plug.

12. A fuel control device, comprising, a casing having a bore, a hollow plunger movable within said bore and having one end closed, said bore having a liquid inlet and opposite end outlets, a needle valve member carried by said closed plunger end and cooperating with one of said outlets, a spring confined within said plunger and coacting with the interior of said closed end, a plug carried by said casing and extending into the opposite end of said plunger, said plug being tapered and cooperable with said latter plunger end to control the other of said outlets, and tension adjusting means for said spring passing through said plug and manipulable from the exterior of said casing.

CHARLES R. BULLER.